United States Patent [19]

Bose

[11] Patent Number: 4,585,985

[45] Date of Patent: Apr. 29, 1986

[54] METHOD OF REAL TIME OPERATING POINT IDENTIFICATION AND POLE ADJUSTMENT FOR AN INDUCTION MOTOR DRIVE SYSTEM

[75] Inventor: Bimal K. Bose, Latham, N.Y.

[73] Assignee: General Electric Company, Schenectady, N.Y.

[21] Appl. No.: 639,173

[22] Filed: Aug. 9, 1984

[51] Int. Cl.$^4$ .............................................. H02P 5/40
[52] U.S. Cl. .................................... 318/803; 318/807
[58] Field of Search ................. 318/811, 803, 807–810

[56] References Cited

U.S. PATENT DOCUMENTS 4,258,302  3/1981  Plunkett ............................. 318/723
4,442,393  4/1984  Abbondanti ........................ 318/802

OTHER PUBLICATIONS

Sen et al, "Induction Motor Drives with Microcomputer Control System," Conference IAS Annual Meeting 1980, Cincinnati, OH, USA, Sep. 28–Oct. 3, 1980.
B. K. Bose, "Adjustable Speed AC Drives—A Technology Status Review", Proceedings of the IEEE, vol. 70, No. 2, Feb. 1982, pp. 116–135.
Kaufman & Plunkett, "A High-Performance Torque Controller Using a Voltage Source Inverter and Induction Machine", IEEE/IAS Conference Record, 1981, pp. 863–878.
Strejc, State Space Theory of Discrete Linear Control, Wiley & Sons, Chichester, 1981, pp. 263–270.
Munro, Modern Approaches to Control System Design, Peregrinus Ltd., London, 1979, pp. 199–232.

Primary Examiner—David Smith, Jr.
Attorney, Agent, or Firm—Mark L. Mollon; James C. Davis, Jr.; Marvin Snyder

[57] ABSTRACT

A microcomputer based method for adjusting feedback loop gains ensures a fast, predetermined response of an induction motor drive system. A pre-computed look-up table contains gain values to be loaded into feedback regulators, the gain values corresponding to each operating point of the induction motor having the values necessary to keep the poles of the closed loop system substantially constant.

5 Claims, 10 Drawing Figures

$$\begin{bmatrix} V_{so} \\ 0 \\ 0 \\ 0 \end{bmatrix} = \begin{bmatrix} R_s & -\omega_{eo}L_s & 0 & \omega_e L_m \\ \omega_{eo}L_s & R_s & -\omega_e L_m & 0 \\ 0 & (\omega_{eo}-\omega_{ro})L_m & R_r & -(\omega_{eo}-\omega_{ro})L_r \\ -(\omega_{eo}-\omega_{ro})L_m & 0 & (\omega_{eo}-\omega_{ro})L_r & R_r \end{bmatrix} \begin{bmatrix} i_{qso} \\ i_{dso} \\ i_{qro} \\ i_{dro} \end{bmatrix}$$

$$\begin{bmatrix} \Delta i_{qs} \\ \Delta i_{ds} \\ \Delta i_{qr} \\ \Delta i_{dr} \\ \Delta \omega_r \\ \Delta i_d \\ \Delta V_c \end{bmatrix} = \frac{1}{L_s L_r - L_m^2} \begin{bmatrix} R_s L_r + \frac{6}{\pi^2} R_c m_o^2 L_r & (L_s L_r - L_m^2)\omega_{eo} + L_m^2 \omega_{ro} & -(L_s L_r - L_m^2) i_{dro} & -(L_s L_r - L_m^2) i_{dso} & 0 & 0 \\ -(L_s L_r - L_m^2)\omega_{eo} - L_m^2 \omega_{ro} & R_s L_r & -L_m & (L_s L_r - L_m^2) i_{qso} & 0 & 0 \\ -R_s L_m - \frac{6}{\pi^2} R_c m_o^2 L_m & -L_m L_r \omega_{ro} & 0 & -(L_s L_r - L_m^2) i_{dro} & 0 & 0 \\ L_m L_s \omega_{ro} & -R_s L_m & L_s & (L_s L_r - L_m^2) i_{qro} & 0 & 0 \\ -\frac{3}{8}\frac{P^2}{J} L_m (L_s L_r - L_m^2) i_{dro} & \frac{3}{8}\frac{P^2}{J} L_m (L_s L_r - L_m^2) i_{qro} & 0 & 0 & 0 & 0 \\ -\frac{3}{\pi}\frac{R_c}{L} m_o (L_s L_r - L_m^2) & 0 & 0 & 0 & 0 & \frac{1}{L}(L_s L_r - L_m^2) \\ \frac{3}{\pi}\frac{1}{C} m_o (L_s L_r - L_m^2) & 0 & 0 & 0 & 0 & 0 \end{bmatrix}$$

$$+ L_s L_r - L_m^2 \begin{bmatrix} 0 & -L_m \\ L_r & 0 \\ 0 & L_s \\ -L_m & 0 \\ 0 & 0 \\ 0 & 0 \end{bmatrix}$$

Fig. 7A

Fig. 7B $$\begin{bmatrix} -R_r L_m & L_m L_r \omega_{ro} & & & & & L_m^2 i_{dso} + L_m L_r i_{dro} \\ -L_m L_r \omega_{ro} & -R_r L_m & & & & & -L_m^2 i_{qso} - L_m L_r i_{qro} \\ R_r L_s & (L_s L_r - L_m^2)\omega_{eo} - L_s L_r \omega_{ro} & & & & & -L_m L_s i_{dso} - L_s L_r i_{dro} \\ -(L_s L_r - L_m^2)\omega_{eo} + L_s L_r \omega_{ro} & R_s L_r & & & & & L_m L_s i_{qso} + L_s L_r i_{qro} \\ \tfrac{3}{8}\tfrac{P^2}{J} L_m(L_s L_r - L_m^2) i_{dso} & -\tfrac{3}{8}\tfrac{P^2}{J} L_m(L_s L_r - L_m^2) i_{qso} & & & & & 0 \\ 0 & 0 & & & & & 0 \\ 0 & 0 & & & & & 0 \\ \left(\tfrac{2}{\pi} R_c I_{do} + \tfrac{2}{\pi} V_{co} - \tfrac{12}{\pi^2} R_c m_o i_{qso}\right) L_r & & & & & & \\ 0 & & & & & & \\ -\left(\tfrac{2}{\pi} R_c I_{do} + \tfrac{2}{\pi} V_{co} - \tfrac{12}{\pi^2} R_c m_o i_{qso}\right) L_m & & & & & & \\ 0 & & & & & & \\ \tfrac{3}{\pi}\tfrac{R_c}{L} i_{qso}(L_s L_r - L_m^2) & & & & & & \\ -\tfrac{3}{\pi}\tfrac{1}{C} i_{qso}(L_s L_r - L_m^2) & & & & & & \end{bmatrix} \begin{bmatrix} 0 \\ 0 \\ 0 \\ \Delta \omega_e \\ \Delta V_d \\ \Delta m \end{bmatrix}$$

$$\begin{bmatrix} -\frac{2}{\pi}R_c m_o L_r & & & & & -\frac{2}{\pi}m_o L_r \\ 0 & & & & & 0 \\ \frac{2}{\pi}R_c m_o L_m & & & & & \frac{2}{\pi}m_o L_m \\ 0 & & & & & 0 \\ 0 & & & & & 0 \\ \frac{R+R_c}{L}(L_s L_r - L_m^2) & & & & & \frac{1}{L}(L_s L_r - L_m^2) \\ -\frac{1}{C}(L_s L_r - L_m^2) & & & & & 0 \end{bmatrix} \begin{bmatrix} \Delta i_{qs} \\ \Delta i_{ds} \\ \Delta i_{qr} \\ \Delta i_{dr} \\ \Delta \omega_r \\ \Delta i_d \\ \Delta V_c \end{bmatrix}$$

METHOD OF REAL TIME OPERATING POINT IDENTIFICATION AND POLE ADJUSTMENT FOR AN INDUCTION MOTOR DRIVE SYSTEM

BACKGROUND OF THE INVENTION

This invention relates to an adaptive control for an induction motor drive system and more particularly to a microcomputer-based real time pole identification and adjustment scheme for an induction motor drive system.

DC machine drives are being replaced by induction motor drives in high performance industrial applications, such as servo drives in robotics and numerically controlled machines to take advantage of rugged, low maintenance induction motors. In such applications, the drive system is not only required to be stable, but should have a fast and predetermined transient response. In complex control systems, a mathematical model of the system showing the relationship between the system variables is typically used to analyze the system. Since the system under consideration is dynamic in nature, the descriptive model contains differential equations. If the equations can be linearized, then Laplace transforms can be utilized to simplify their solution.

A fast, predetermined transient response in a system requires that the poles of the drive system be assigned unique locations irrespective of operating point. The poles of the drive system are determined from the transfer function, defined as the ratio of the Laplace transform of an output variable to the Laplace transform of an input variable. Poles are defined as critical complex frequencies where the transfer function becomes infinite. The form of the transient response of the closed loop system depends on the pole locations of the transfer function of the closed loop system drive.

It is well known that an induction motor drive constitutes a nonlinear multivariable system and, therefore, the transient response dictated by the poles varies at each steady state operating point. A conventional control system is designed with fixed control parameters so that for the worst pole locations the system is stable and its transient response is satisfactory. However, the transient response of such a conventional control system disadvantageously differs at each operating point.

Previous attempts have been made to represent a drive system by a simplified linear model and to place the poles by state variable feedback through a fixed topology feedback gain matrix. See, for example, B. K. Bose, "Adjustable Speed AC Drives—A Technology Status Review", *Proceedings of the IEEE,* Vol. 70, No. 2, February 1982, pp. 116-135, herein incorporated by reference, where it is pointed out that the gain matrix of the controller can locate all the poles of the system if state variable feedback is used.

OBJECTS OF THE INVENTION

It is a principal object of the present invention to provide a new and improved adaptive control method for an induction motor drive system which is not subject to the foregoing disadvantages.

It is another object of the present invention to provide an induction motor drive control system with a fast, predetermined response at all operating points.

It is a further object of the present invention to identify the poles of an open loop induction motor drive system at each steady state operating point and to identify and load the feedback regulator gains at each steady state operating point which provide controller poles such that the overall system poles remain substantially constant.

SUMMARY OF THE INVENTION

These and other objects of the present invention are carried out by the disclosed method for obtaining a fast, predetermined transient response in an induction motor drive system having a control using state variable feedback through a variable regulator gain matrix. When the induction motor is operating at steady state, selected steady state values are determined. Values for the gain of the control regulators are then determined from a look-up table. Loading these gain values into the system regulators fixes the locations of the drive system poles to achieve a fast, predetermined transient response at each particular operating point. The look-up table may also contain information about the poles of the open loop induction drive.

These and other aspects of the invention, together with the features and advantages thereof, will become apparent from the following detailed specification, when read with the accompanying drawings in which applicable reference numerals have been carried forward.

DETAILED DESCRIPTION OF THE INVENTION

Figure 1:
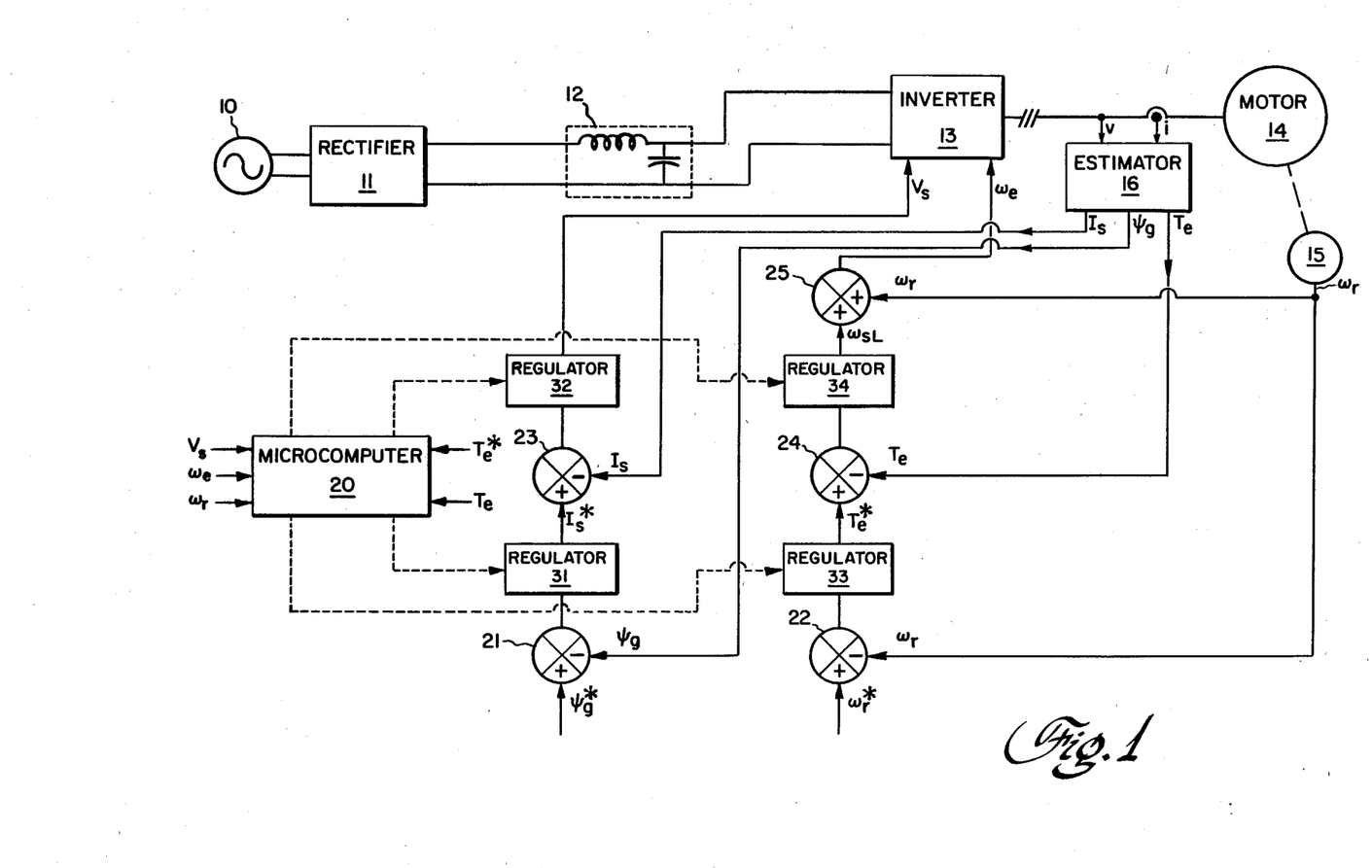
FIG. 1 is a block diagram of an induction motor drive system with torque-slip control.

Referring now to FIG. 1, an induction motor drive control system is shown with torque-slip control. An air gap flux command $\psi^*_g$ is compared in a summer 21 to a calculated air gap flux signal $\psi_g$ from an estimator circuit 16. Estimator circuit 16, which may comprise an apparatus described, for example, in U.S. Pat. No. 4,258,302, assigned to the assignee of the present invention, receives signals proportional to three-phase stator voltage and current and provides calculated torque $T_e$, flux $\psi_g$ and RMS stator current $I_s$ signals. A flux regulator 31 provides a stator current command $I^*_s$, in accordance with the gain of regulator 31, in response to the error signal from summer 21 which compares calculated flux $\psi_g$ and commanded flux $\psi^*_g$. Stator current command $I^*_s$ is compared to calculated stator current signal $I_s$ in a summer 23. A current regulator 32 provides a inverter voltage command $V_s$ to a dc-ac 3 phase inverter 13 in accordance with the gain of regulator 32. Inverter 13 is coupled to AC supply 10 through rectifier 11 and filter 12 and coupled to an induction motor 14. Supply 10, rectifier 11, filter 12, inverter 13 and motor 14 comprise the open loop drive system of the present invention.

A rotor speed command $\omega^*_r$ is compared in a summer 22 to a speed signal $\omega_r$ from a tachometer 15 coupled to the shaft of induction motor 14. A speed regulator 33 responsive to the error signal from summer 22, provides a torque command $T^*_e$, in accordance with the gain of regulator 33, which is compared to the calculated torque $T_e$ from estimator 16 in a summer 24. A torque regulator 34 provides a slip command $\omega_{sl}$, in accordance with the gain of regulator 34, which is summed with rotor speed signal $\omega_r$ in a summer 25. The output of summer 25 is an inverter frequency command $\omega_e$ to dc-ac inverter 13.

Figure 2:
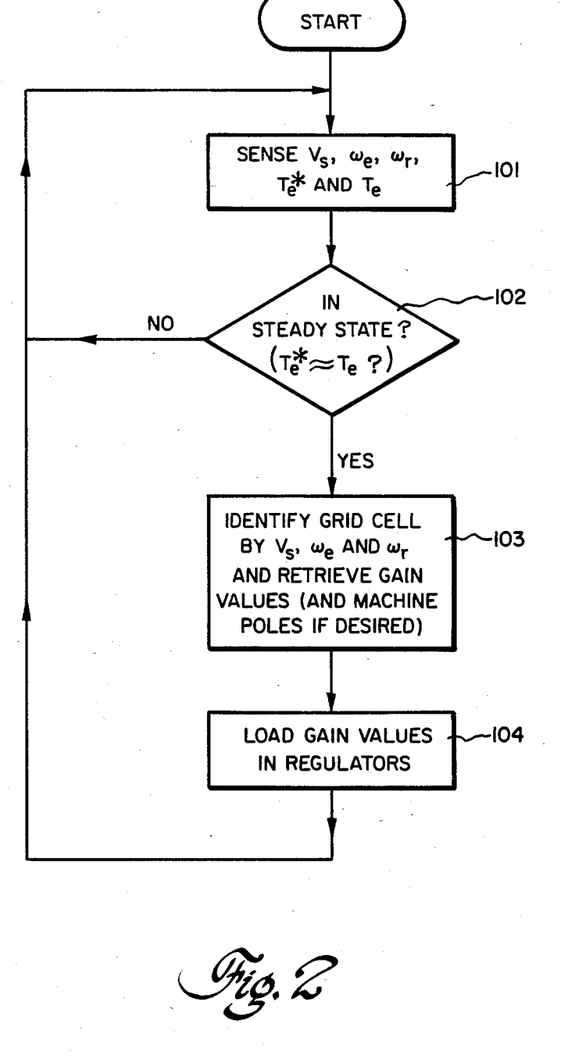
FIG. 2 is a flow chart for real time operating point identification and pole adjustment.

A microcomputer 20, such as an Intel 8086, receives input signals of inverter voltage $V_s$ from regulator 32, inverter frequency $\omega_e$ from summer 25, rotor speed $\omega_r$ from tachometer 15, and commanded and actual torque, $T^*_e$ and $T_e$, from regulator 33 and estimator 16, respectively. This is indicated at step 101 in the flow chart of FIG. 2. When the motor is in steady state operation, as determined at step 102 by microcomputer 20 of the system shown in FIG. 1 according to the difference between commanded torque $T^*_e$ and calculated torque $T_e$ being below a predetermined minimum, appropriate compensator gain values for regulators 31–34 of the system are determined for the present operating point as shown at step 103. The, regulator gain values fix the poles of the controller. The controller poles are made to track the machine poles at each operating point in a manner which keeps the overall closed loop system poles substantially constant. New gain values are loaded in regulators 31–34 at step 104, followed by a return to step 101. Thus, the transient response remains substantially constant for all operating points.

Figure 3:
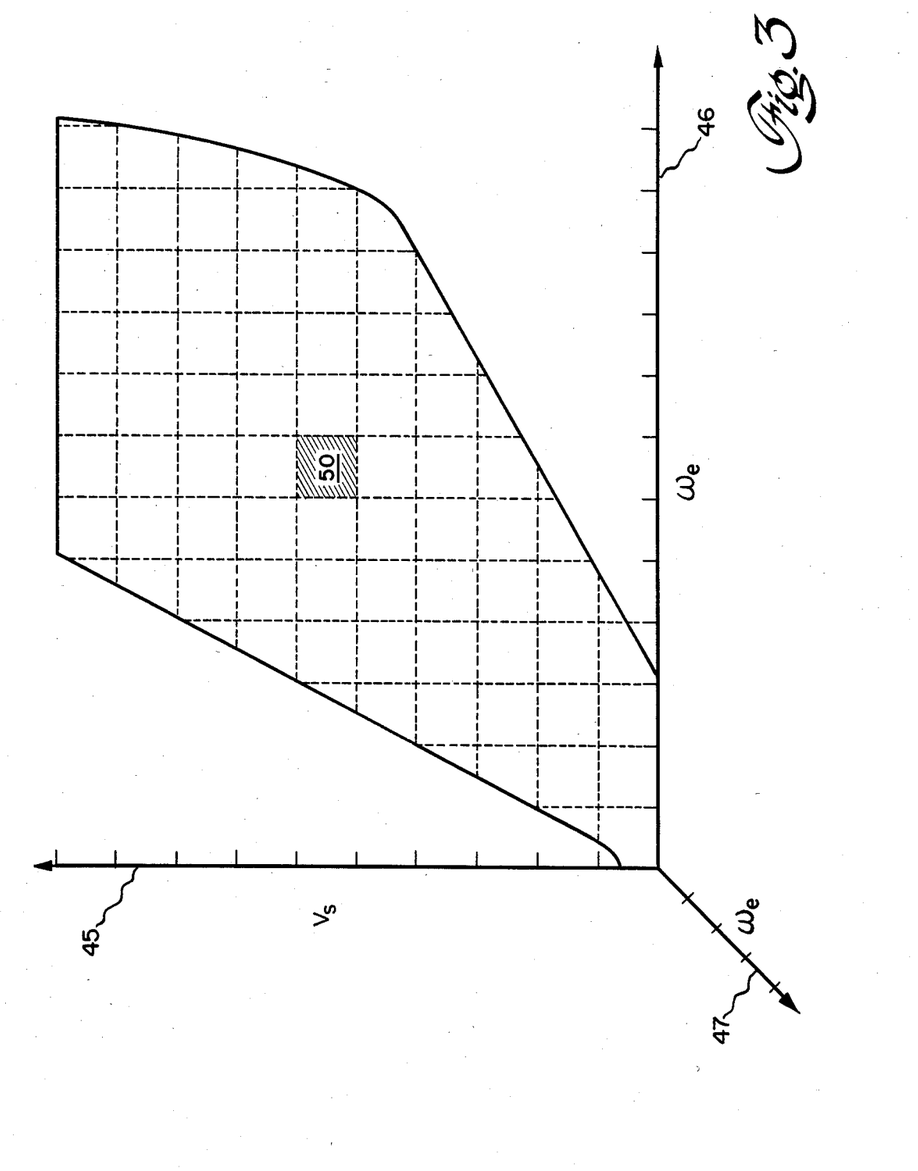
FIG. 3 represents a portion of the look-up table stored in the microcomputer of FIG. 1.

The gain values for each operating point corresponding to each grid cell in the microcomputer look-up table of FIG. 3 are stored in the look-up table. Each grid cell, such as grid cell 50, for example, is addressed by the steady state values of the variables defining the operating point, i.e. inverter voltage $V_s$ on axis 45, inverter frequency $\omega_e$ on axis 46, and rotor speed $\omega_r$ on axis 47. As shown in FIG. 3, grid cells are limited to areas corresponding to permissible operating points.

Figure 4:
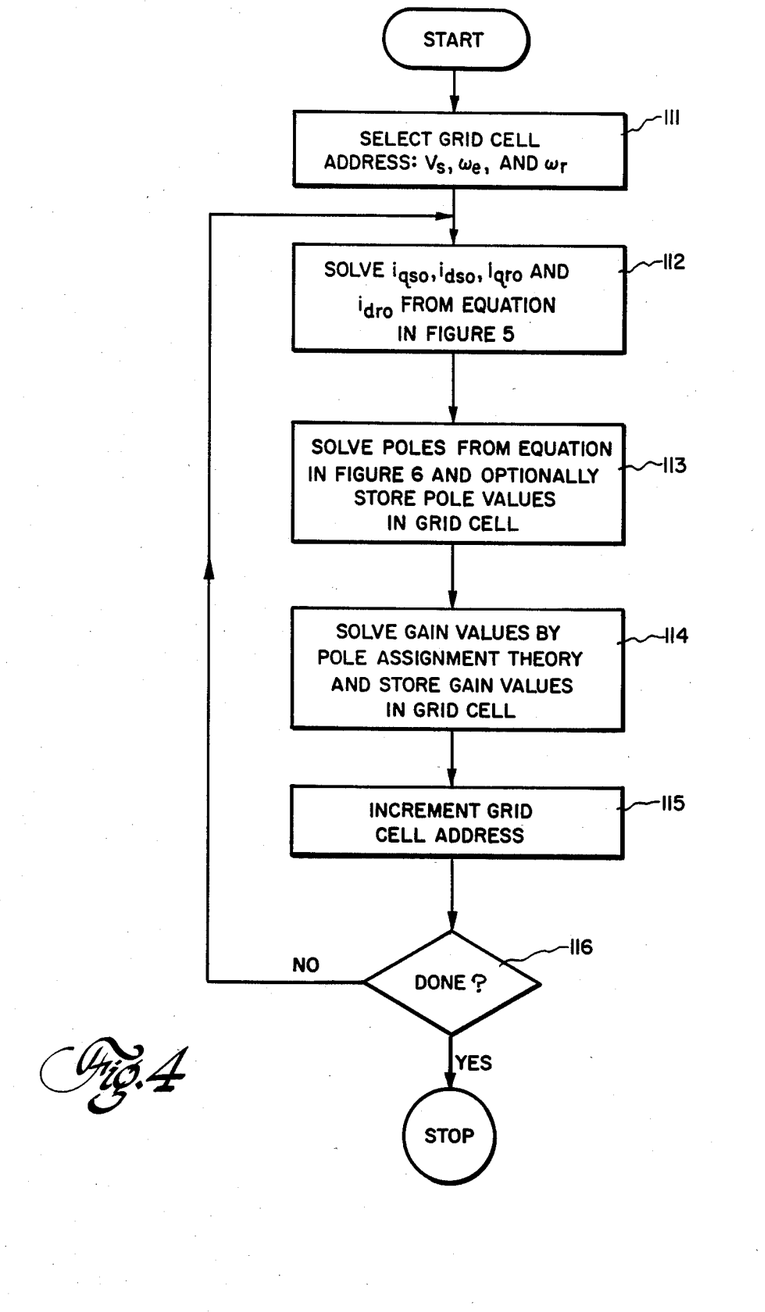
FIG. 4 is a flow chart for the off line generation of the look-up table of FIG. 3.

The contents of the grid cells in the look-up table in FIG. 3 are generated for a particular induction motor and drive system off line at steps 111–114 of the flow chart of FIG. 4 by determining the pole locations of the open loop system at each steady state operating point and the regulator gains which provide the desired closed loop poles. Each grid cell stores the gain values appropriate for the steady state values which address the grid cell. Each grid cell optionally stores the open loop poles which may be useful for instrumentation purposes.

Figure 5:
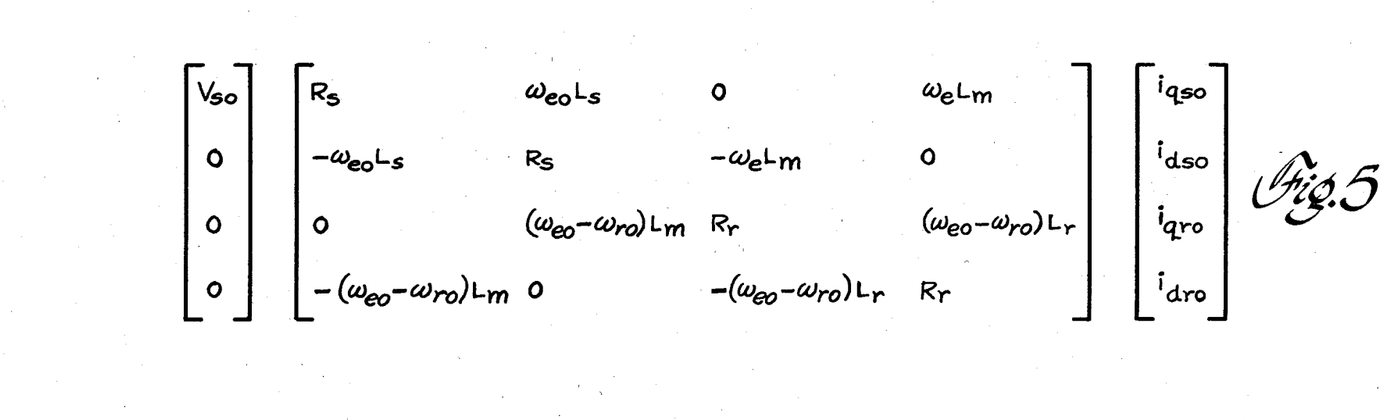
FIG. 5 shows the matrix equation used to solve the steady state currents of the induction motor drive system of FIG. 1.
Figure 6:
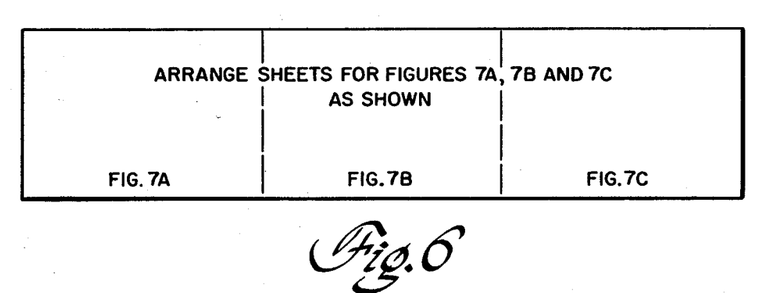
FIGS. 6 and 7A-7C show the small signal state space model of the induction motor drive system of FIG. 1.
Figure 7A:
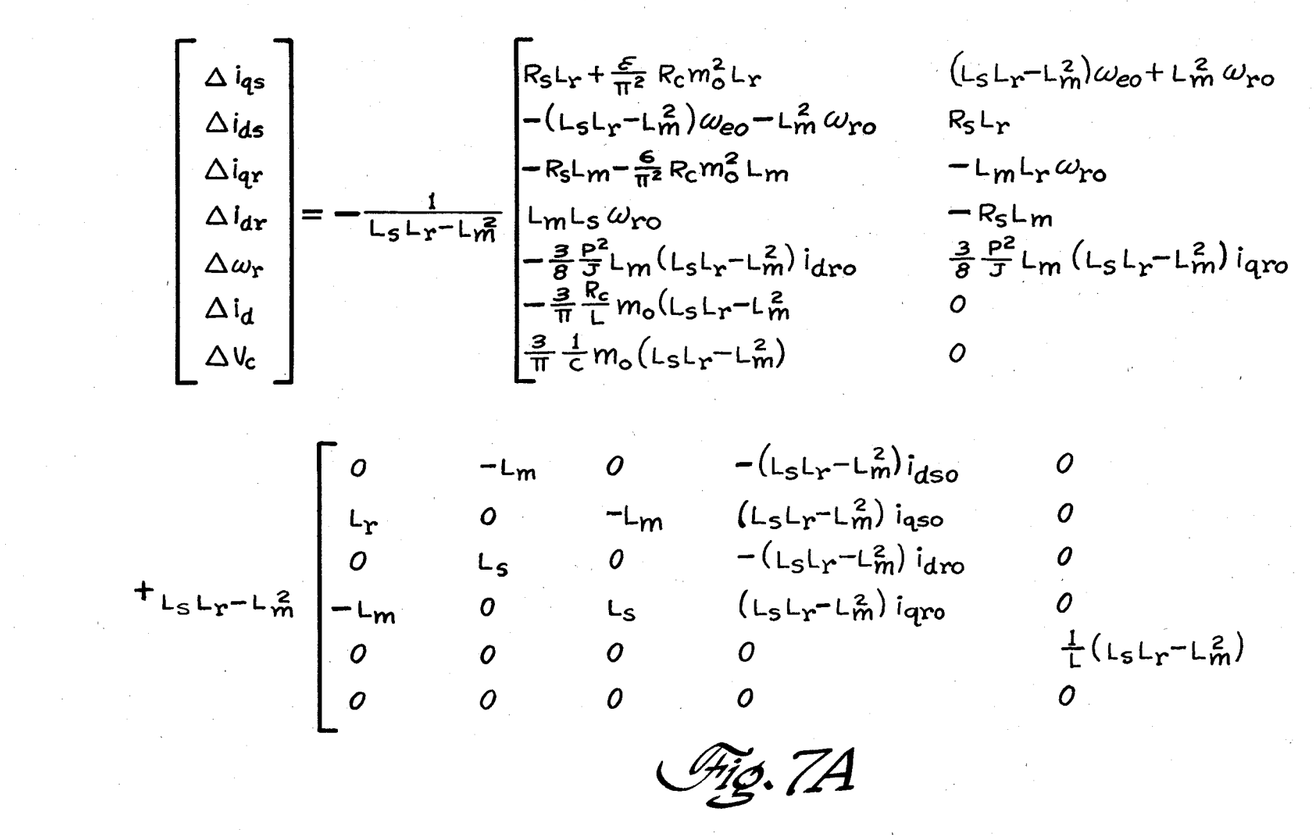
Figure 7B:
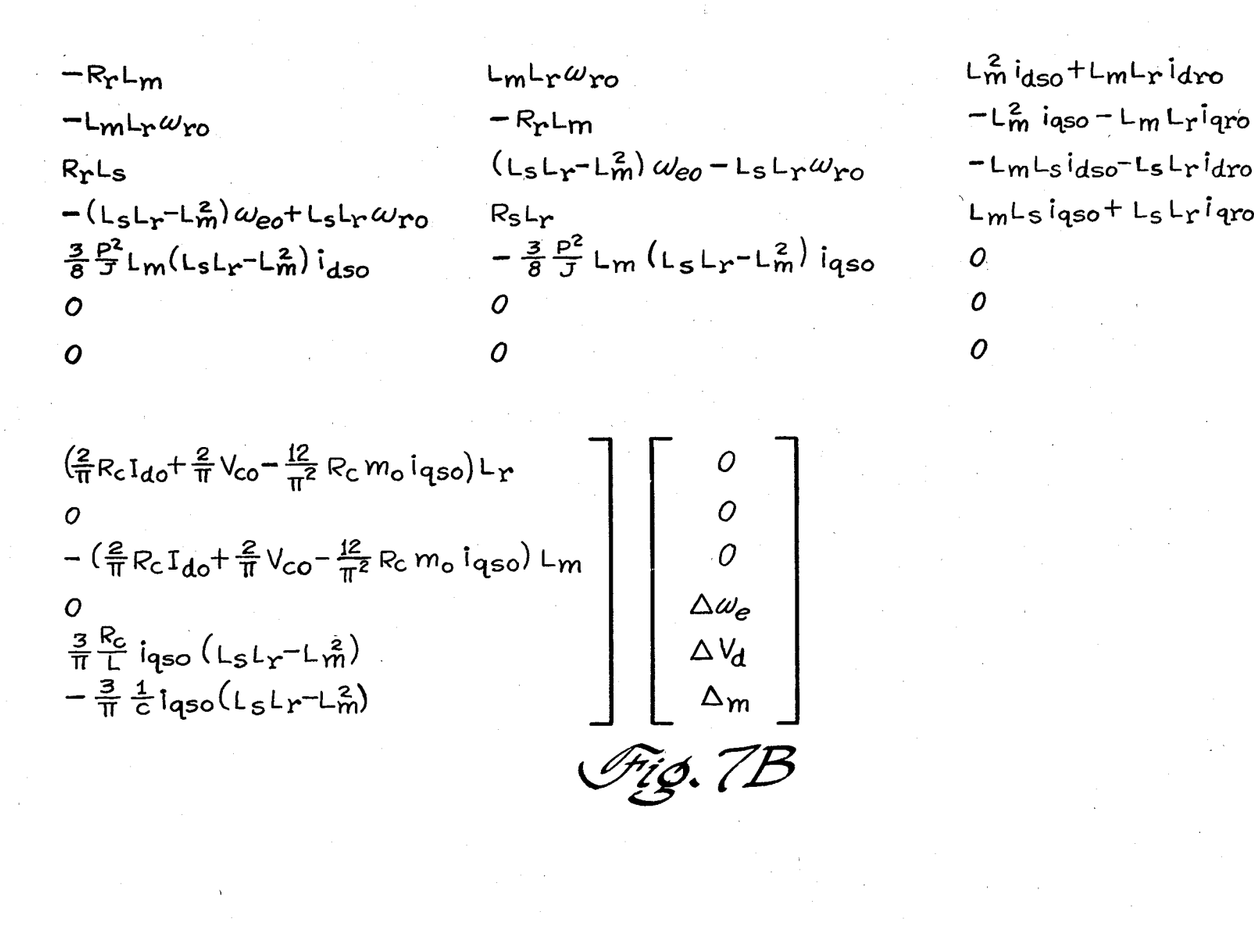
Figure 7C:
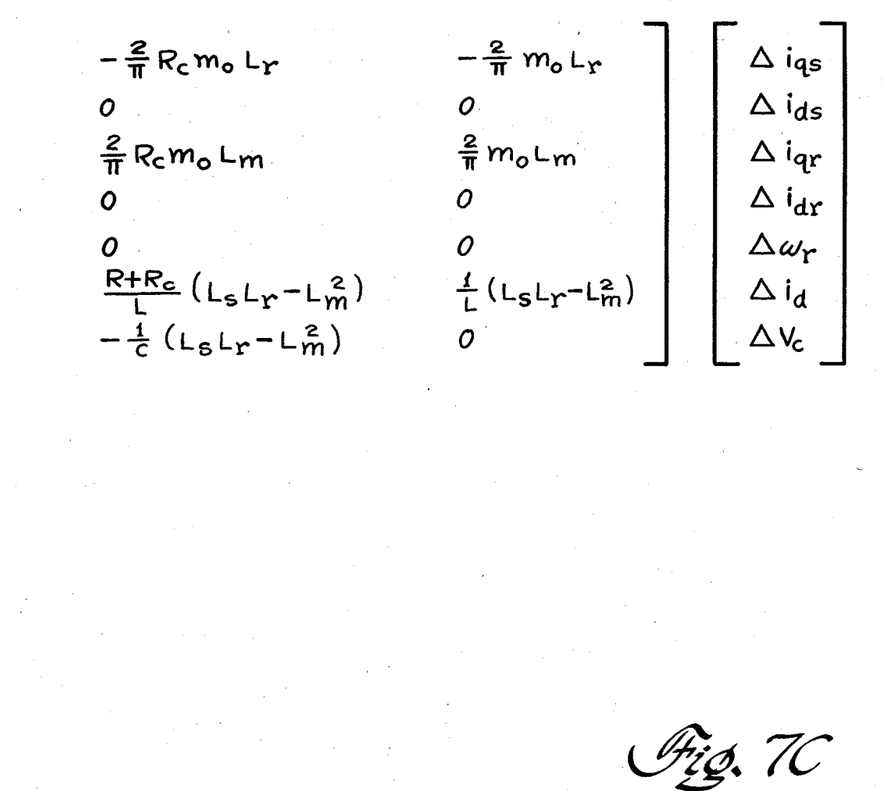

As set forth in the flow chart of FIG. 4, for each grid cell in the look-up table of FIG. 3 and its corresponding steady state values selected at step 111, stator and rotor direct and quadrature currents in a synchronously rotating reference frame equivalent circuit are first determined at step 112. These parameters are then used at step 113 to solve the poles of the equation in FIG. 6, thus giving the poles for the open loop induction motor described by the equations in FIGS. 5 and 6. These equations and their solutions are known in the art and are described, for example, in G. Kaufman and A. Plunkett, "A High-Performance Torque Controller Using a Voltage Source Inverter and Induction Machine", *IEEE/IAS Conference Record*, 1981, pp. 863–878 which is incorporated herein by reference.

Knowledge of the poles of the open loop machine and the desired poles of the overall closed loop system is then used at step 114 to determine the required gain values for regulators 31–34 of FIG. 1 and the grid cell address is incremental at step 115. Step 114 is performed by means of the well known pole assignment (or pole placement) theory whereby a plant (open loop machine) is described by a first equation and its controller is described by a second equation. The gain matrix of the equation describing the controller is determined in such a way that the closed loop system has the desired pole locations. Specifically, while it is intended that the gain values be calculated by computer algorithms, reference is made to Strejc, *State Space Theory of Discrete Linear Control*, Wiley & Sons, Chichester, 1981, pp. 263–270, for solutions based on methods using the canonical form of controllability or the general form of the matrix of dynamics. A recursive pseudoinverse procedure for solving the pole assignment problem is given in Chapter 11 of Munro, *Modern Approaches to Control System Design*, Peregrinus Ltd., London, 1979. Both Strejc and Munro are herein incorporated by reference.

Returning to FIG. 2, having identified steady state values addressing a grid cell and having retrieved the gain values stored at that grid cell, microcomputer 20 of FIG. 1 loads the gain values into corresponding regulators 31–34 at step 104. When regulators 31–34 are analog devices in a controller separate from microcomputer 20, the gain values are fed to regulators 31–34 through respective D/A converters (not shown). When control is implemented by microcomputer 20, gain values for regulators 31–34 are software parameters which are updated with the new gain values.

Figure 8:
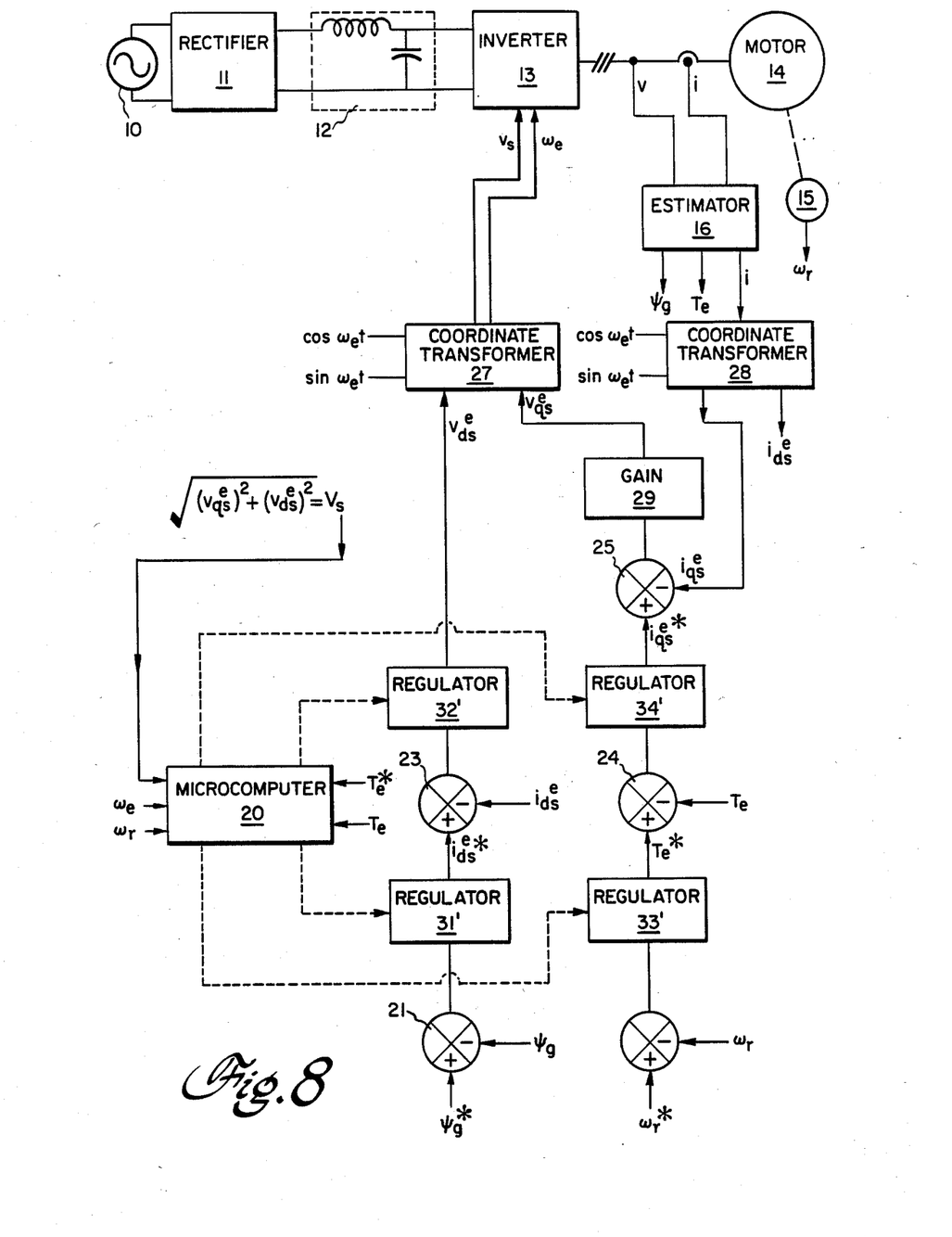
FIG. 8 is a block diagram of an induction motor drive system with field-oriented control.

The torque-slip controlled induction drive system described above provides a fast, predetermined response at each operating point based on the adjustment of the controller poles resulting in substantially constant closed loop poles. The method may also be used with a field-oriented control implemented by the controller as shown in FIG. 8. The controller of FIG. 8 differs from that of FIG. 1 in the addition of coordinate transformers 27 and 28, and constant gain 29. Coordinate transformer 28 provides quadrature and direct current signals as shown. Coordinate transformer 27 converts direct and quadrature voltage signals into a three phase inverter voltage command $V_s$. Field-oriented controls are known in the art and are described in B. K. Bose, supra. Another example of a field-oriented control is shown in U.S. Pat. No. 4,442,393 to Abbondanti. The gain values at each operating point are determined as described previously with an appropriate equation describing the field-oriented controller.

The foregoing has demonstrated a control method for an induction motor drive system with a fast, predetermined response at all operating points by adjusting the regulator gain values at each operating point to maintain substantially constant closed loop system poles. Thus, even though the induction motor drive system is nonlinear, a substantially constant transient response is achieved.

While preferred embodiments of the present invention have been shown and described herein, it will be obvious that such embodiments are provided by way of example only. Numerous variations, changes, departures, substitutions and partial and full equivalents will now occur to those skilled in the art without departing from the invention herein. Accordingly, it is intended that the invention be limited only by the spirit and scope of the appended claims.

What is claimed is:

1. A method of obtaining a fast, predetermined transient response in an induction motor drive system having a control using state variable feedback through a variable regulator gain matrix, said method comprising the steps of:

determining when the induction motor of said drive system is operating in steady state;

determining selected steady state values defining an operating point;

looking up regulator gain values in a look-up table addressed by said selected steady state values, said look-up table containing regulator gain values at each distinct operating point to fix the locations of the drive system poles to achieve the desired transient response at each operating point; and loading said gain values in the corresponding regulators.

2. The method of claim 1 wherein said control is a torque-slip control and wherein said selected steady state values are stator voltage, inverter frequency and motor speed.

3. The method of claim 1 wherein said control is a field-oriented control and wherein said selected steady state values are stator voltage, inverter frequency and motor speed.

4. The method of claim 1 wherein said look-up table further includes the poles of the open loop induction motor drive system at each operating point defined by said steady state values.

5. An induction motor drive system comprising:

an induction motor;

an inverter coupled to said motor and adapted to be coupled to a source of DC power for supplying variable frequency and amplitude AC power to said induction motor in response to a frequency command and an amplitude command;

an estimator coupled to said inverter and to said motor for calculating the torque, flux and stator current of said motor;

a tachometer coupled to said motor for measuring actual rotor speed;

feedback means coupled to said estimator, said tachometer and said inverter for employing state variable feedback to generate said frequency and amplitude commands in response to said calculated torque, flux and stator current and in response to an operator commanded flux and an operator commanded rotor speed, said feedback means including a variable regulator gain matrix; and a microcomputer coupled to said feedback means and to said tachometer for controlling the gains of said variable regulator gain matrix to achieve a predetermined response at each steady state operating point of said motor.

* * * * *